(12) United States Patent
Liu et al.

(10) Patent No.: US 11,848,128 B2
(45) Date of Patent: Dec. 19, 2023

(54) MAGNETIC COMPONENT AND POWER MODULE

(71) Applicant: Delta Electronics (Shanghai) Co., Ltd., Shanghai (CN)

(72) Inventors: Shiwei Liu, Shanghai (CN); Lei Chang, Shanghai (CN); Haijun Yang, Shanghai (CN); Zengyi Lu, Shanghai (CN); Jinfa Zhang, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 450 days.

(21) Appl. No.: 17/023,394

(22) Filed: Sep. 17, 2020

(65) Prior Publication Data
US 2021/0110958 A1    Apr. 15, 2021

(30) Foreign Application Priority Data

Oct. 12, 2019  (CN) .......................... 201910968838.2
May 9, 2020   (CN) .......................... 202010386986.6

(51) Int. Cl.
*H01F 27/22*    (2006.01)
*B60L 53/122*   (2019.01)
(Continued)

(52) U.S. Cl.
CPC ............ *H01F 27/22* (2013.01); *B60L 53/122* (2019.02); *H01F 27/24* (2013.01); *H01F 27/325* (2013.01)

(58) Field of Classification Search
CPC ........ H01F 27/22; H01F 27/24; H01F 27/325; H01F 3/10; H01F 27/025; H01F 27/306;
(Continued)

(56) References Cited

U.S. PATENT DOCUMENTS 4,596,974 A * 6/1986 Tobben ................... H01F 19/00
                                                   336/197
6,600,402 B1 * 7/2003 LaFleur .................. H01F 27/22
                                                   336/84 R
(Continued)

FOREIGN PATENT DOCUMENTS

CN    102047357 A    5/2011
CN    102682962 A    9/2012
(Continued)

OTHER PUBLICATIONS

Corresponding China office action dated Apr. 2, 2021.

*Primary Examiner* — Mang Tin Bik Lian
(74) *Attorney, Agent, or Firm* — CKC & Partners Co., LLC

(57) ABSTRACT

The present disclosure provides a magnetic component and a power module, relating to the technical field of power electronics; the magnetic component provided by the present disclosure includes: a first heat sink, a magnetic core extending in a transverse direction and a winding structure wound on the magnetic core, the winding structure includes at least a first coil and a second coil arranged adjacently along the transverse direction, a gap is provided between the first coil and the second coil, at least part of the first heat sink is arranged in the gap, the first heat sink is in thermal contact with the first coil, the second coil and the magnetic core.

6 Claims, 14 Drawing Sheets

(51) Int. Cl.
*H01F 27/24* (2006.01)
*H01F 27/32* (2006.01)

(58) Field of Classification Search
CPC ...... H01F 27/2876; H01F 27/08; H01F 27/26; H01F 27/263
See application file for complete search history.

(56) References Cited

U.S. PATENT DOCUMENTS

| | | | |
|---|---|---|---|
| 7,800,257 B2 | 9/2010 | Lu | |
| 8,049,590 B2* | 11/2011 | Huh | H01F 38/10 336/212 |
| 2006/0082945 A1* | 4/2006 | Walz | H01F 27/22 361/103 |
| 2014/0300438 A1* | 10/2014 | Schekulin | H01F 41/04 336/61 |
| 2014/0327505 A1* | 11/2014 | Schekulin | H01F 41/04 336/55 |
| 2016/0133380 A1* | 5/2016 | Yang | H01F 27/325 336/61 |
| 2017/0110241 A1* | 4/2017 | Yang | H01F 27/28 |
| 2019/0385785 A1* | 12/2019 | Li | H01F 27/28 |
| 2020/0135379 A1* | 4/2020 | Lu | H01F 27/306 |

FOREIGN PATENT DOCUMENTS

| | | |
|---|---|---|
| CN | 203456236 U | 2/2014 |
| CN | 203733570 U | 7/2014 |
| CN | 105810400 A | 7/2016 |
| CN | 205609326 U | 9/2016 |
| CN | 106571209 A | 4/2017 |
| CN | 108022729 A | 5/2018 |
| CN | 108990362 A | 12/2018 |
| CN | 110310804 A | 10/2019 |

\* cited by examiner

MAGNETIC COMPONENT AND POWER MODULE

CROSS-REFERENCE TO RELATED APPLICATION

This application claims priority to Chinese Patent Application No. 201910968838.2, filed on Oct. 12, 2019, and Chinese Patent Application No. 202010386986.6, filed on May 9, 2020, the contents of the above applications are hereby incorporated by reference in their entireties.

TECHNICAL FIELD

The present disclosure relates to the technical field of power electronics, and in particular, to a magnetic component and a power module.

BACKGROUND

With the continuous development of switching power technologies and sustained development of various new energy power generation and consumption equipment, high power modules have become an obvious direction for the development and demand, and with the increasing higher and higher power requirements, how to dissipate heat from a magnetic component in a power module has become a research hotspot.

A magnetic component may be a transformer or an inductor, which generally includes a magnetic core and multiple coils wrapped on the magnetic core, and heat generated inside the magnetic component is mainly emitting from the magnetic core and the coils. For the heat generated by the magnetic component, a liquid cooling cavity is often used for heat dissipation, specifically, the magnetic component is placed in the liquid cooling cavity, and the liquid cooling cavity is filled with a thermally conductive adhesive, thus making the adhesive partially or completely surround the magnetic component, in this way, the heat generated by the magnetic component is transferred to the liquid cooling cavity by virtue of the thermally conductive adhesive.

However, since thermal conductivity of the thermally conductive adhesive is usually not high, which is about 0.5 W/m·K-3.0 W/m·K, thereby render the heat dissipation capacity of the magnetic component relatively low; in addition, a periphery of the magnetic core is covered with bobbin and coils and the material of bobbin is usually bakelite, but the thermal conductivity of bakelite is only 0.25 W/m·K, so it is difficult to bring the magnetic core into directly contact with the thermally conductive adhesive, thereby further render the heat dissipation effect of the magnetic component poor.

SUMMARY

Embodiments of the present disclosure provide a magnetic component and a power module, so as to solve the issue of poor heat dissipation effect of the magnetic component.

In order to achieve the above purpose, the embodiments of the present disclosure provide the following technical solutions.

In a first aspect, an embodiment of the present disclosure provides a magnetic component, where the magnetic component includes a first heat sink, a magnetic core extending in a transverse direction and a winding structure wound on the magnetic core;

the winding structure at least includes a first coil and a second coil adjacently arranged along the transverse direction, a gap is provided between the first coil and the second coil, at least part of the first heat sink is arranged in the gap, the first heat sink is in thermal contact with the first coil, the second coil and the magnetic core.

Compared with the prior art, the magnetic components provided by the embodiments of the present disclosure has the following advantages:

In one kind of magnetic components provided by the embodiments of the present disclosure, the winding structure includes at least a first coil and a second coil arranged adjacently along the transverse direction, a gap is provided between the first coil and the second coil, at least part of the first heat sink is arranged in the gap, the first heat sink is in thermal contact with the first coil, the second coil and the magnetic core, thereby render the first heat sink beneficial for heat dissipation of the magnetic core, the first coil and the second coil along the vertical and longitudinal directions at the same time, thus shortening the heat dissipation path, reducing thermal resistance, improving a heat dissipation effect of the magnetic component.

In a second aspect, an embodiment of the present disclosure further provides a magnetic component, where the magnetic component includes a magnetic core extending in a transverse direction and a winding structure wound on the magnetic core, the magnetic core includes a first sub-magnetic core and a second sub-magnetic core arranged in a stacked manner along a vertical direction; the magnetic component further includes a second heat sink that is T-shaped or L-shaped, where the second heat sink is inserted between the first sub-magnetic core and the second sub-magnetic core along the transverse direction.

In a third aspect, an embodiment of the present disclosure further provides a magnetic component, where the magnetic component includes: a magnetic core, a winding structure and a heat dissipating ring, the winding structure includes a plurality of coils, and at least one of the coil is used as a primary winding of a transformer, at least one of the coils is used as a secondary winding of the transformer, the magnetic core includes a winding column extending in a transverse direction, the plurality of coils and the heat dissipating ring are sleeved on the winding column, and at least one heat dissipating ring is arranged between each two adjacent coils, and an inner ring surface of the heat dissipating ring is in thermal contact with the winding column, and the heat dissipating ring is in thermal contact with the adjacent coils.

Compared with the prior art, the magnetic component provided by the embodiment of the present disclosure has the following advantages:

the magnetic component provided by the embodiment of the present disclosure includes a magnetic core, and a winding structure and a heat dissipating ring which are sleeved on the winding column of the magnetic core and are spaced at interval, by using the heat dissipating ring to achieve thermal contact with the magnetic core and the winding structure respectively, a heat dissipation path is shortened, a heat dissipation effect of the magnetic component is improved, therefore, the magnetic component provided by the embodiment of the present disclosure solves the issue of poor heat dissipation effect of the magnetic component.

In a fourth aspect, an embodiment of the present disclosure further provides a power module, the power module includes a plastic cover, a metal tank and any one of the aforementioned magnetic component, the metal tank and the plastic cover are enclosed into a receiving cavity, and the magnetic component is arranged in the receiving cavity.

The advantages of the power module are the same as those of the magnetic components described in the first to the third aspect, which are not described herein again for brevity.

In addition to the aforementioned technical issue solved by the embodiments of the present disclosure, the aforementioned technical features constituting the technical solutions, and the aforementioned advantageous effects brought by the technical features of these technical solutions, other technical issues that can be solved by the magnetic component and the power module provided by the embodiments of the present disclosure, other technical features included in the technical solutions, and the advantageous effects brought by these technical features will be further detailed in the specific implementation manners.

BRIEF DESCRIPTION OF DRAWINGS

In order to more clearly illustrate the technical solutions in the embodiments of the present disclosure or in the prior art, the drawings needed to be used in the description of the embodiments or the prior art will be briefly described below, obviously, the drawings in the following description are only part embodiments of the present disclosure, these drawings and text descriptions are not intended to limit the scope of the concept of the present disclosure in any way, but to explain the concept of the present disclosure to those skilled in the art by referring to specific embodiments for those skilled in the art, other drawings can be obtained according to these drawings without paying any creative efforts.

REFERENCE SIGNS

10—Magnetic component;
11—Magnetic core;
110—Winding column;
111—First sub-magnetic core;
112—Second sub-magnetic core;
12—Winding structure;
121—First coil;
122—Second coil;
123—Gap;
124—Third coil;
125—Fourth coil;
13—First heat sink;
131—Heat conducting portion;
132—Extending portion;
1321—First part;
1322—Second part;
14—Second heat sink;
15—Heat dissipating ring;
151—Arc-shaped heat sink;
152—Extending portion;
153—Heat dissipating surface;
154—Groove;
20—Power module;
21—Plastic cover;
22—Metal tank;
3—Heat dissipating conduit;
4—Heat dissipating metal tooth.

DESCRIPTION OF EMBODIMENTS

Figure 1A:
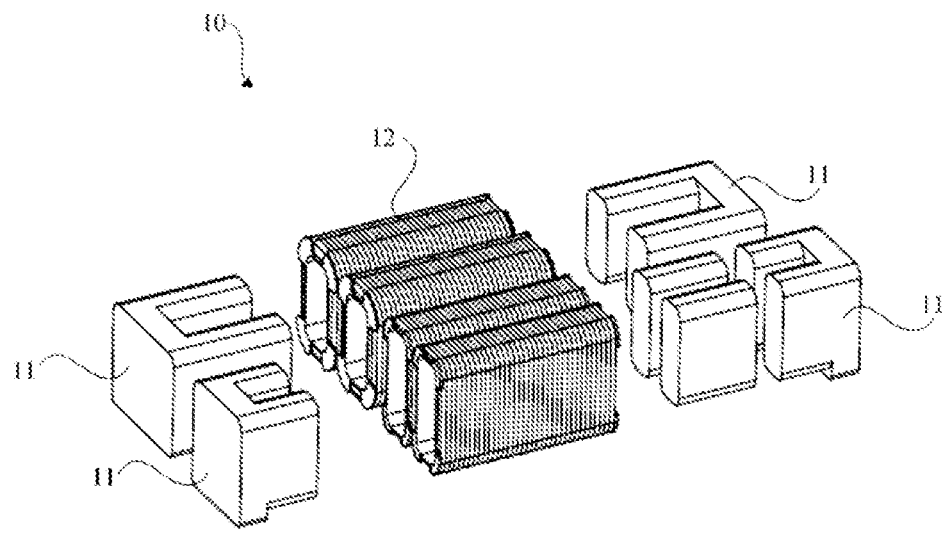
FIG. 1A is a schematic structural diagram of an existing magnetic component.
Figure 1B:
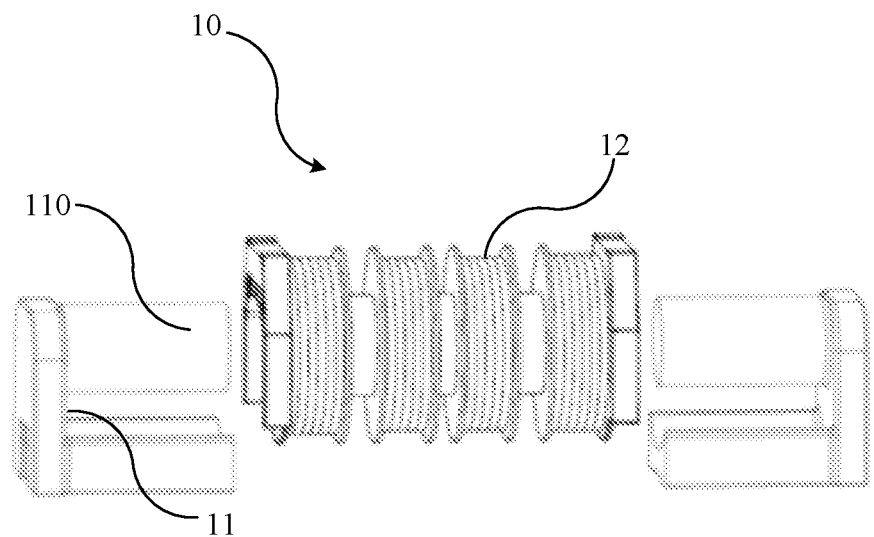
FIG. 1B is a schematic structural diagram of another existing magnetic component.

A magnetic component such as a transformer and an inductor usually includes a magnetic core and a winding, the heat generated inside the magnetic component is mainly emitting from the magnetic core and the winding. FIG. 1A and FIG. 1B show magnetic components (for example a transformer structure) respectively. Referring to FIG. 1A, the magnetic component 10 includes a magnetic core 11, a bobbin assembled on the magnetic core 11, and a winding structure 12 wound on the bobbin, generally, the winding structure 12 includes multiple layers of windings, and the heat dissipated from the magnetic core 11 needs to pass through a gap between the magnetic core and a bobbin, the bobbin, the multiple layers of windings, an insulating tape, etc., and is then transferred to the outside. Referring to FIG. 1B, the magnetic component 10 also includes a magnetic core 11 and a winding structure 12, the magnetic core 11 includes a winding column 110, and the winding structure 12 is wound on the bobbin or directly on the winding column 110, similar to the magnetic component 10 shown in FIG. 1A, the heat dissipated from the magnetic core 11 needs to pass through the magnetic core 11, the winding structure 12 and is then transferred to the outside.

It can be seen that in the above two types of magnetic components, the magnetic core 11 is wrapped by the winding structure 12, and has a poor heat dissipation capacity, in addition, since the heat transferring path is long, thereby rendering the heat dissipation effect of the entire magnetic component poor. In order to solve the issue of poor heat dissipation effect of the magnetic component, the embodiment of the present disclosure provides a heat sink between any adjacent coils of the winding structure 12, the heat sink is in thermal contact with the coils and the magnetic core respectively, therefore, the heat sink can be beneficial for heat dissipation of the magnetic core and the coils along the vertical and longitudinal directions at the same time, thus shortening a heat dissipation path, reducing a thermal resistance, improving a heat dissipation effect of the magnetic component.

In order to make the above objects, features and advantages of the embodiments of the present disclosure more clear, the technical solutions in the embodiments of the present disclosure will be clearly and completely described in combination with the drawings in the embodiments of the present disclosure. Obviously, the described embodiments are only part of the embodiments of the present disclosure, but not all of the embodiments. Based on the embodiments of the present disclosure, all other embodiments obtained by those skilled in the art without creative efforts are within the protection scope of the present disclosure.

Embodiment 1

Figure 2:
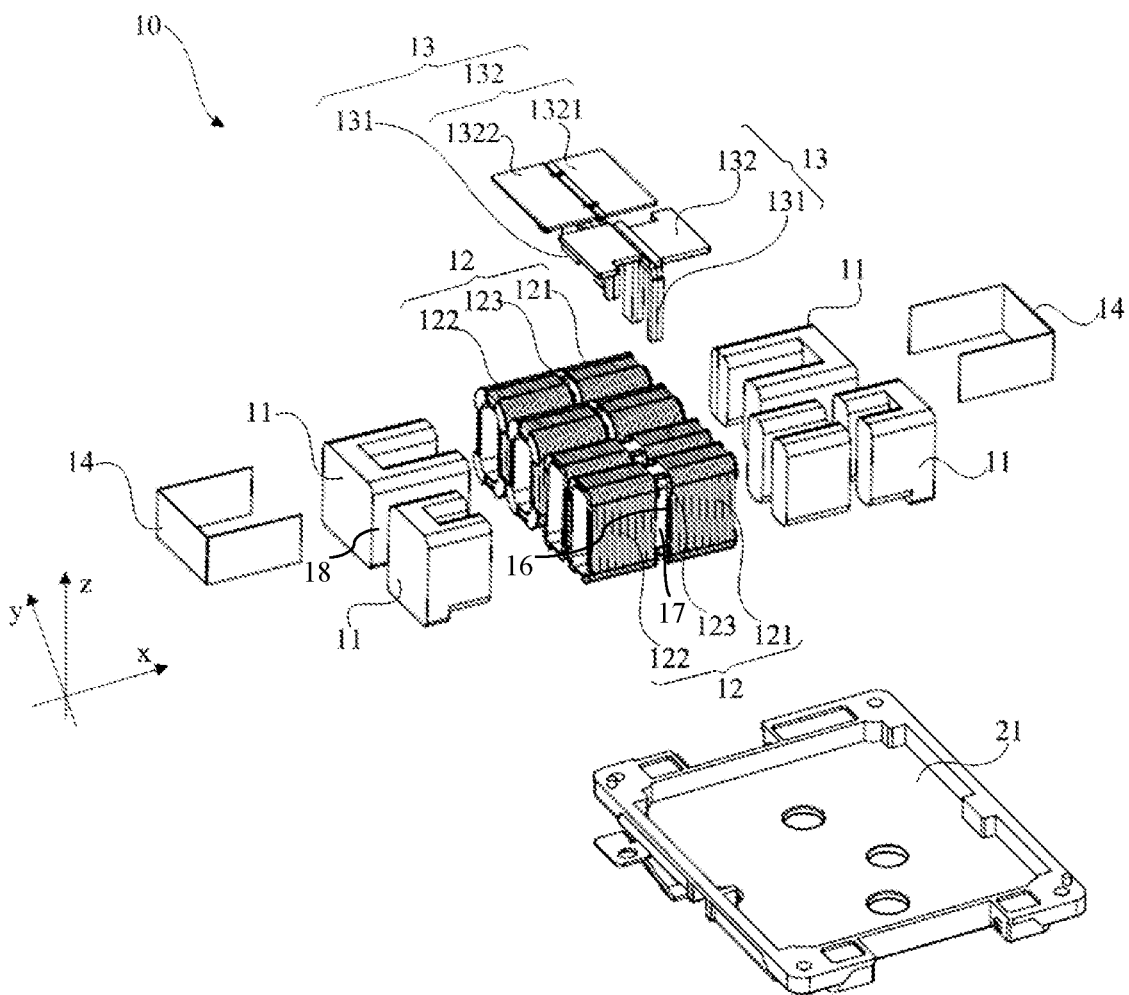
FIG. 2 is an explosive diagram of a magnetic component according to Embodiment 1 of the present disclosure.
Figure 3:
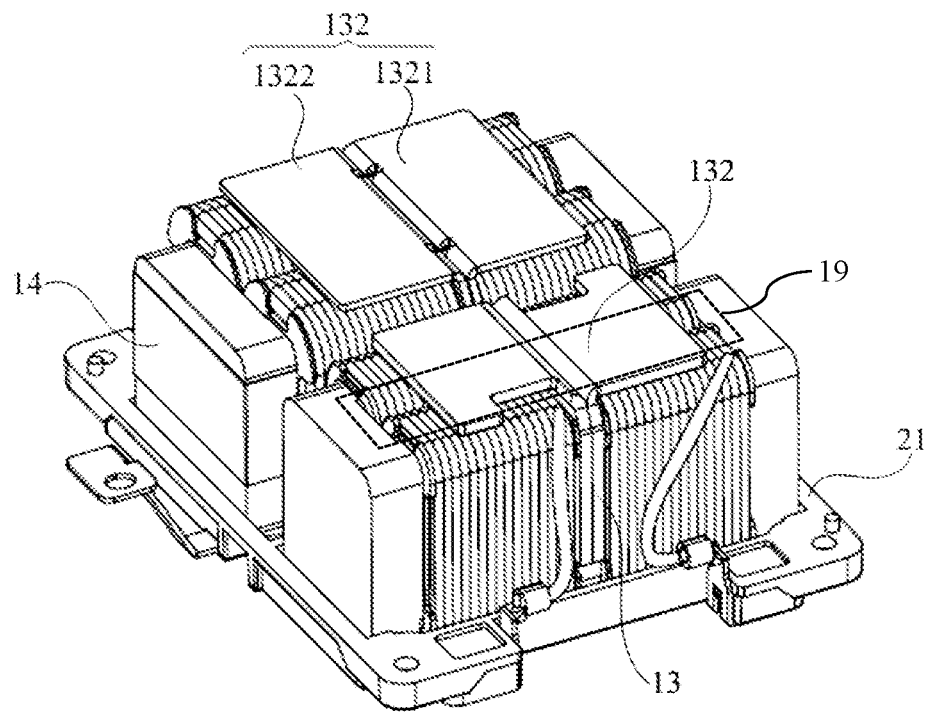
FIG. 3 is an overall assembly diagram of a magnetic component according to Embodiment 1 of the present disclosure.
Figure 4:
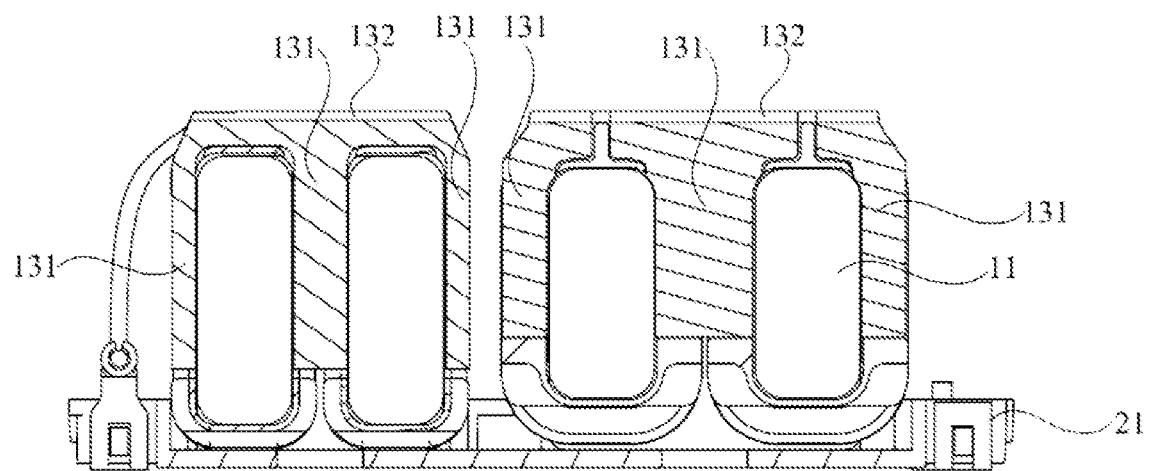
FIG. 4 is a sectional schematic diagram of a magnetic component according to Embodiment 1 of the present disclosure.

FIG. 2 is an explosive diagram of a magnetic component according to Embodiment 1 of the present disclosure, FIG. 3 is an overall assembly diagram of a magnetic component according to Embodiment 1 of the present disclosure, FIG. 4 is a sectional schematic diagram of a magnetic component according to Embodiment 1 of the present disclosure. Referring to FIG. 2 to FIG. 4, the embodiment provides a magnetic component 10, which includes a first heat sink 13, a magnetic core 11 extending in a transverse direction and a winding structure 12 wound on the magnetic core 11. Where the winding structure 12 at least includes a first coil 121 and a second coil 122 arranged adjacently along the transverse direction, a gap 123 is provided between the first coil 121 and the second coil 122, at least part of the first heat sink 13 is arranged in the gap 123, and the first heat sink 13 is in thermal contact with the first coil 121, the second coil 122 and the magnetic core 11.

Specifically, in the embodiment, a transverse direction refers to a direction along which the winding structure 12 is wound and arranged, i.e. the x direction in FIG. 2; a longitudinal direction refers to a direction that is horizontally perpendicular to the transverse direction, i.e. the y direction in FIG. 2; a vertical direction refers to a direction that is vertically perpendicular to the transverse direction and the longitudinal direction, i.e. the z direction in FIG. 2. As shown in FIG. 2, the winding structure 12 includes a first coil 121 and a second coil 122, and a first heat sink 13 is inserted between the first coil 121 and the second coil 122, so that the first heat sink 13 is in thermal contact with the first coil 121, the second coil 122 and the magnetic core 11, in this way, heat from the first coil 121, the second coil 122 and the magnetic core 11 can be dissipated along the vertical and longitudinal directions at the same time with the help of the first heat sink 13. In addition, by dividing the winding structure 12 into two coils and inserting the heat sink 13 between the two coils, the issue of heat dissipation difficulty caused by the fact that the winding structure 12 extends too long along the transverse direction can be avoided, and the overall heat dissipation effect of the magnetic component can be improved. In the embodiment, the overall cooling capacity of the first heat sink 13 can lower a temperature of the magnetic component 10 by 15 degrees or more.

In the embodiment, a plurality of groups of magnetic components 10 are independently designed and integrally encapsulated on a plastic cover 21. It is also illustrated that the winding structure 12 includes a first coil 121 and a second coil 122. It should be understood that the winding structure 12 can be divided into a plurality of adjacently arranged coils, and a gap 123 is provided between the two adjacent coils, the first heat sink 13 can be inserted into the gap 123 and is in thermal contact with the two adjacent coils and the magnetic core 11, respectively. In order to enable the inserting of the first heat sink 13 into the gap 123, and the heat contact with the first coil 121, the second coil 122 and the magnetic core 11, the first heat sink 13 can be a sheet-like heat fin, and the gap 123 can directly arrive at a surface of the magnetic core 11 from the surface of the winding structure 12. It should be understood that the specific depth and width of the gap 123 can be selected and set according to specific setting manners of the winding structure 12 and the magnetic core 11, and the size of the first heat sink 13, as long as the first heat sink 13 can be set in the gap 123, and can be in thermal contact with the winding structure 12 and the magnetic core 11, which is not limited in the embodiment.

Optionally, the first heat sink 13 can be bonded, respectively, to the first coil 121, the second coil 122 and the magnetic core 11 through a first thermally conductive adhesive 16 (for example, its heat conductivity coefficient is about 1.6 W/m·K), so as to realize the thermal contact. It should be understood that the thermal contact can refer to a direct contact, i.e. mutual adhesion, or an indirect contact through a thermally conductive adhesive or other materials with high thermal conductivities. For example, in the magnetic component provided by the present disclosure, the first heat sink 13 may be in direct contact with the first coil 121, the second coil 122 and the magnetic core 11, or the first heat sink 13 may also can be in indirect contact with the first coil 121, the second coil 122 and the magnetic core 11 through a thermally conductive adhesive or other materials with high heat conductivities. The thermal contact in the following description also has the same or similar meaning, as long as the heat dissipation is effectively achieved by virtue of the thermal contact.

Optionally, a material of the first heat sink 13 may be a metal material with a thermal conductivity greater than or equal to 100 W/m·K. Preferably, the material of the first heat sink 13 is copper, aluminum or aluminum alloy, etc.

Optionally, a material of the first heat sink 13 may also be a non-metal material with a thermal conductivity greater than or equal to 20 W/m·K. Preferably, the material of the first heat sink 13 is a heat conducting ceramic.

Optionally, the first heat sink 13 includes a heat conducting portion 131 that extends vertically from a top of the magnetic core 11 to a bottom of the magnetic core 11, and the heat conducting portion 131 covers at least part of the magnetic core 11. As shown in FIG. 2 to FIG. 4, the heat conducting portion 131 is a heat fin arranged along a vertical direction. The heat fin extends vertically from the top of the magnetic core 11 to the bottom of the magnetic core 11, and a large contact area is formed between the heat fin and the magnetic core 11, the first coil 121 and the second coil 122, which helps the magnetic core 11, the first coil 121 and the second coil 122 to dissipate heat in the vertical direction. In addition, the heat conducting portion 131 is in thermal contact with opposed surfaces of the first coil 121 and the second coil 122, and extends from a surface of the magnetic core 11 to an outside of the winding structure 12 along the longitudinal direction, which is beneficial for the heat dissipation of the magnetic core 11, the first coil 121 and the second coil 122 in the longitudinal direction.

Optionally, the first heat sink 13 also includes an extending portion 132 that is connected to the heat conducting portion 131, the extending portion 132 extends along the transverse direction, and the extending portion 132 is in thermal contact with at least part of an outer surface of the first coil 121 and/or an outer surface of the second coil 122. As shown in FIG. 2 to FIG. 4, the first heat sink 13 includes the extending portion 132 and the heat conducting portion 131 which are mutually connected and perpendicular to each other. The extending portion 132 is in thermal contact with the outer surfaces of the first coil 121 and the second coil 122, so as to better dissipate heat generated by the first coil 121 and the second coil 122. At the same time, the presence of the extending portion 132 can facilitate the heat dissipation of the heat conducting portion 131 connected therewith, thus further improving the heat dissipation effect.

It should be understood that the extending portion 132 may be simply in thermal contact with the outer surface of the first coil 121, or the extending portion 132 may be simply in thermal contact with the outer surface of the second coil 122, or the extending portion 132 may be in thermal contact with both of the outer surface of the first coil 121 and the outer surface of the second coil 122. The embodiment shows an implementation of the thermal contact between the extending portion 132 and, the first coil 121 and the second coil 122. Specifically, as shown in FIG. 2, the extending portion 132 can include a first part 1321 and a second part 1322 which are connected to each other, where the first part 1321 is in thermal contact with the first coil 121 and the second part 1322 is in thermal contact with the second coil 122. In addition, from the perspective of FIG. 3, the extending portion 132 thermally contacts with an upper side of the winding structure 12. In other embodiments, the extending portion 132 may also be in thermal contact with a front side and/or a rear side (and the like) of the winding structure 12.

Optionally, the magnetic core 11 can include two U-shaped core structures which are buckled together to form a closed magnetic path 19. It is worth noted that in other embodiments, the magnetic core structures in other shapes can also form a closed magnetic path 19. For example, the magnetic core 11 may also include a magnetic core structure in the shape of UI, UIU, E, PQ, etc.

Optionally, for the convenience of winding structure 12 on the magnetic core 11, as shown in FIG. 2, the magnetic component 10 also includes a bobbin sleeved on the outer circumference of the magnetic core 11, and the winding structure 12 is wound on the bobbin, so that the winding structure 12 can be conveniently installed on the magnetic core 11.

Since there is a gap 123 between the first coil 121 and the second coil 122, the first heat sink 13 is arranged in the gap 123, and the bobbin is arranged between the first coil 121 and the magnetic core 11, and between the second coil 122 and the magnetic core 11. In order to realize the thermal contact between the first heat sink 13 and the magnetic core 11, in an implementation, the bobbin is an integrated structure, and the first coil 121 and the second coil 122 are wound on the bobbin, and the bobbin has a hollow structure 17 at a position corresponding to the gap 123. When the first heat sink 13 is inserted into the gap 123, due to the setting of the hollow structure 17, the thermal contact between the first heat sink 13 and the magnetic core 11 can be realized by virtue of a first thermally conductive adhesive 16, so as to dissipate heat. Where the bobbin has a hollow structure 17 at the position corresponding to the gap 123, so as to increase the contact area between the first heat sink 13 and the magnetic core 11, thereby improving the heat dissipation effect of the magnetic core 11, besides, the contact area with the winding is increased so as to enhance the heat dissipation of the winding structure 12.

In another implementation, the bobbin includes a first bobbin structure and a second bobbin structure that are separated from each other. The first coil 121 is wound on the first bobbin structure, the second coil 122 is wound on the second bobbin structure, the first bobbin structure and the second bobbin structure are separated by a distance to form a gap 123. When the first heat sink 13 inserted in the gap 123, that is, it is inserted between the first bobbin structure and the second bobbin structure, so as to form a thermal contact with the magnetic core 11, since opposed surfaces of the first bobbin structure and the second bobbin structure have hollow structures 17, the heat dissipation effect of the magnetic core 11 and the coil 12 can be improved.

Figure 5:
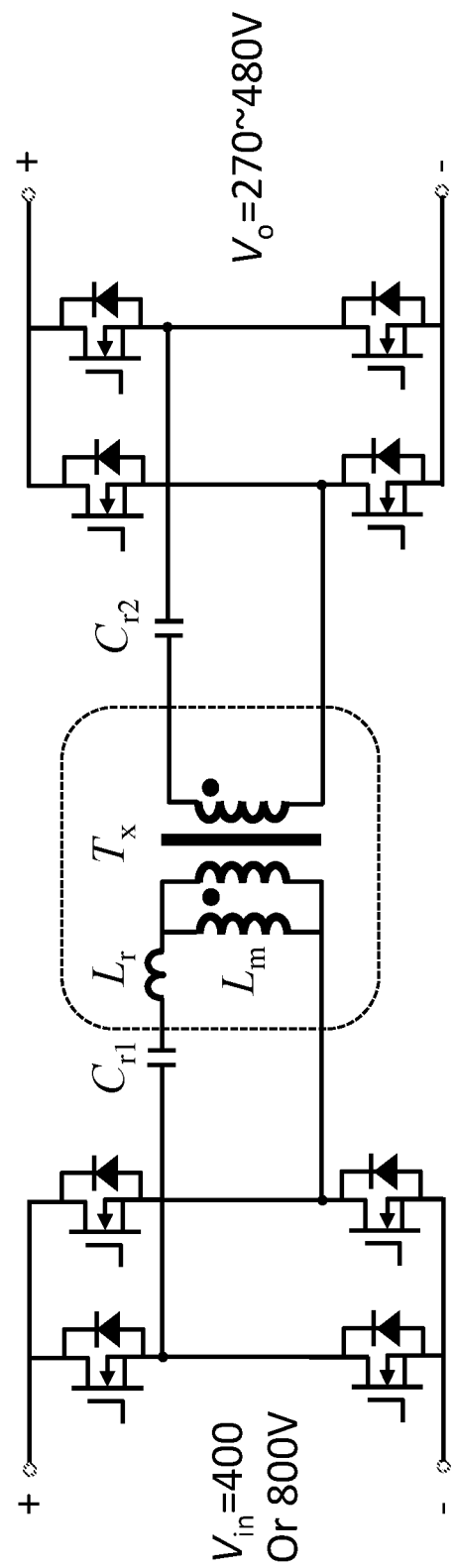
FIG. 5 is an application circuit diagram of a magnetic component according to Embodiment 1 of the present disclosure.

FIG. 4 shows a sectional view of the magnetic component 11 along a longitudinal direction at the first heat sink 13, where the first heat conducting portion 131 penetrates into an inner part of the magnetic component and covers at least part of the magnetic core 11. FIG. 5 is an application circuit diagram of a magnetic component according to Embodiment 1, where the circuit may be LLC or Boost LC or etc. Take a uni-directional converter LLC as an example, the power flow flows from left to right, an input voltage is typically 400V or 800V, and an output voltage is in a range of 270-480V or even wider. Take a bidirectional converter Boost LC as an example, the power flow can flow in both ways. The voltage on one side is typically 400V or 800V, and the voltage on the other side is in a range of 270-480V or even wider. Where the magnetic component includes resonant inductor $L_r$ and transformer $T_x$ in a converter resonant tank (including $C_{r1}$, ($C_{r2}$), $L_r$, $T_x$), or the magnetic component can simply be the transformer $T_x$ or the resonant inductor $L_r$. When the magnetic component includes a transformer, the winding structure of the transformer can be arranged along the magnetic core from the inside to the outside in radial direction of the core, for example, the first layer winding as a primary side winding, and the second layer winding as a secondary side winding, etc. The winding structure of the transformer can also be arranged along an axial direction (for example the transverse direction) of a winding column of the magnetic core, as shown in FIG. 2, the first coil is the primary side winding, and the second coil is the secondary side winding, which is referred to as Manner 1; or the number of turns in the primary and secondary sides are divided equally, for example, the first coil includes half of the primary side winding and half of the secondary side winding, and the second coil includes the other half of the primary side winding and the other half of the secondary side winding, so that the ampere-turn of each of the coils is self-balanced, so that the magnetic force between adjacent coils is approximately 0, which is referred to as Manner 2. When the winding structure is arranged radially, the first heat sink can be a metal heat fin or a non-conductive non-magnetic sheet such as ceramic; when the winding structure is arranged axially, the first heat sink can be a non-conductive non-magnetic piece such as ceramic, as in the winding arrangement of Manner 2, the first heat sink can be a metal heat fin, etc. The coil of the transformer can be divided into three portions or more, and the manner in which the winding arrangement is arranged is similar to Manner 1, Manner 2 or other manners. When the magnetic component includes the resonant inductor, and the winding structure of the resonant inductor is divided into multiple coils, an air gap can be provided on the magnetic core, and when the metal heat fin is used, the gap between the coils cannot be placed near the air gap; when the non-conductive non-magnetic heat fin structure such as ceramic is used, relative positions of the gap between the coils and the air gap may not be limited. Where the winding structure can be a single-layer or a multi-layer arrangement, which is not limited herein.

Embodiment 2

Referring to FIG. 2 to FIG. 4, on the basis of Embodiment 1, in the embodiment, the magnetic component 10 also includes two U-shaped (or L-shaped, not shown) second heat sinks 14, one of which is inserted between the magnetic core 11 and the first coil 121 along the transverse direction; specifically, the opening direction of one of the second heat sinks 14 faces towards the magnetic core 11, and is inserted between the magnetic core 11 and the first coil 121 along the transverse direction. In other words, the opening of one U-shaped second heat sink 14 is inserted into the interior of the magnetic core 11 which is surrounded by the coil 121 and is arranged between the magnetic core 11 and the first coil 121. Another second heat sink 14 is inserted between the magnetic core 11 and the second coil 122 along the transverse direction; that is, another U-shaped second heat sink 14 is inserted into the interior of the magnetic core 11 which is surrounded by the coil 122, and is arranged between the magnetic core 11 and the second coil 122. The U-shaped second heat sink 14 is beneficial for the heat dissipation of the magnetic core 11 which is located in the winding structure 12, and heat generated by the magnetic core 11 can be conveniently transferred, through the second heat sink 14 along the transverse direction, from the middle part of the magnetic core 11 surrounded by the winding structure 12 to surfaces on two sides of the magnetic core 11, thus improving the heat dissipation effect of the magnetic core 11.

Optionally, the second heat sink 14 can contact with the surface of the magnetic core 11 by virtue of a second thermally conductive adhesive 18, so that the second heat sink 14 can be in thermal contact with the magnetic core 11. Specifically, the structure of the U-shaped second heat sink 14 can be the same as the structure of the magnetic core 11, and heat dissipation of the U-shaped second heat sink 14 can be achieved by contacting the surface of the U-shaped magnetic core 11 through the second thermally conductive adhesive 18. For example, the surface of the U-shaped magnetic core structure can be coated with the second thermally conductive adhesive 18, and the U-shaped second heat sink 14 can be pasted on the magnetic core 11. It should be understood that the thermal contact between the second heat sink 14 and the magnetic core 11 may also be implemented in other ways.

Optionally, the material of the second heat sink 14 can be a metal material with a thermal conductivity greater than or equal to 100 W/m·K. Preferably, the material of the second heat sink 14 is copper, aluminum or aluminum alloy, etc.

Optionally, the material of the second heat sink 14 can also be a non-metal material with a thermal conductivity greater than or equal to 20 W/m·K. Preferably, the material of the second heat sink 14 is a heat conducting ceramic. In addition, besides the U-shape, it should be understood that the second heat sink 14 may also be in other shapes, as long as it can be inserted between the magnetic core 11 and the winding structure 12 and be partially in thermal contact with the outer surface of the magnetic core, such as an L-shape and so on.

The magnetic component 10 provided by the embodiment includes two U-shaped second heat sinks 14, one of which is inserted between the magnetic core 11 and the first coil 121 along the transverse direction, the other one is inserted between the magnetic core 11 and the second coil 122 along the transverse direction, and the heat generated by the magnetic core 11 is conveniently transferred, along the transverse direction through the second heat sink 14, from the middle part of the magnetic core 11 surrounded by the winding structure to surfaces on both sides of the magnetic core 11, thus further improving the heat dissipation effect of the magnetic core 11. In combination with Embodiment 1, the heat dissipation of the magnetic component 10 can be simultaneously realized in the transverse direction, the vertical direction and the longitudinal direction.

Embodiment 3

Figure 6:
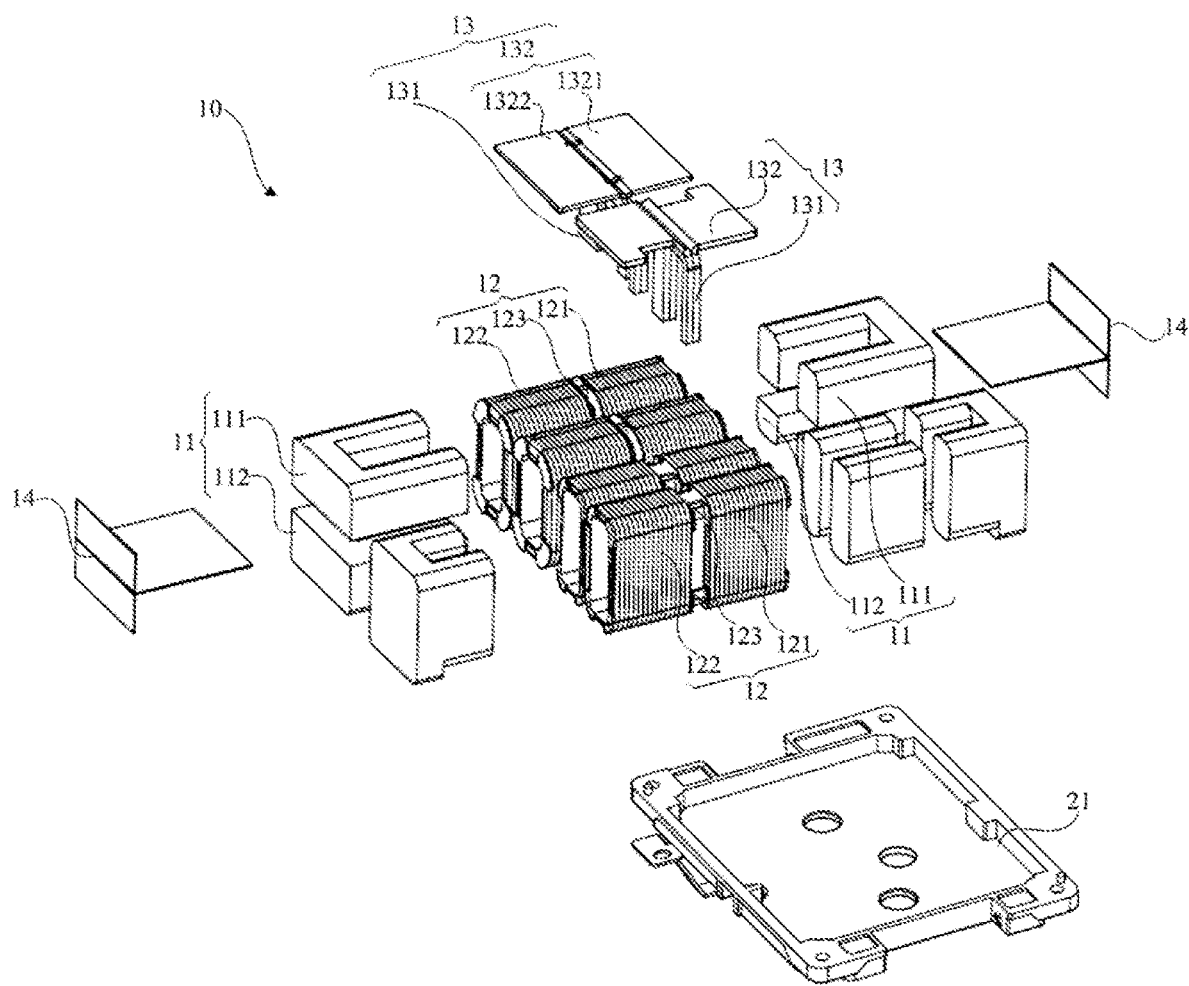
FIG. 6 is an explosive diagram of a magnetic component according to Embodiment 3 of the present disclosure.

FIG. 6 is an explosive diagram of a magnetic component according to Embodiment 3 of the present disclosure. On the basis of Embodiment 1, in the Embodiment 3, the magnetic component 10 further includes two T-shaped (or L-shaped, not shown) second heat sinks 14, and the magnetic core 11 includes a first sub-magnetic core 111 and a second sub-magnetic core 112 arranged in a stacked manner along the vertical direction. Specifically, as shown in FIG. 6, the magnetic core 11 is divided into the first sub-magnetic core 111 and the second sub-magnetic core 112 stacked vertically, and the second heat sink 14 is T-shaped. One of the second heat sinks 14 is inserted between the first sub-magnetic core 111 and the second sub-magnetic core 112 from a first side of the magnetic core 11 along the transverse direction. Specifically, the T-shaped second heat sink 14 is inserted into an inner side of the magnetic core 11 from a left side of the magnetic core 11, and is located between the first sub-magnetic core 111 and the second sub-magnetic core 112, that is, one end of the T-shaped second heat sink 14 is inserted into the inner side of the magnetic core 11, and is arranged between the first sub-magnetic core 111 and the second sub-magnetic core 112. Another second heat sink 14 is inserted between the first sub-magnetic core 111 and the second sub-magnetic core 112 from a second side of the magnetic core 11 along the transverse direction, where the first side and the second side of the magnetic core 11 are oppositely arranged. Specifically, another T-shaped second heat sink 14 is inserted into the inner side of the magnetic core 11 from a right side of the magnetic core 11, and is located between the first sub-magnetic core 111 and the second sub-magnetic core 112, that is, one end of the other T-shaped second heat sink 14 is inserted into the inner side of the magnetic core 11, and is arranged between the first sub-magnetic core 111 and the second sub-magnetic core 112. The T-shaped second heat sink 14 can be beneficial for the heat dissipation of the magnetic core 11 located in the winding structure 12. The heat generated inside the magnetic core 11 can be conveniently transferred, through the second heat sink 14 along the transverse direction, from the inner part of the magnetic core 11 surrounded by the winding structure 12 to surfaces on two sides of the magnetic core 11, thus improving the heat dissipation effect of the magnetic core 11.

Optionally, the T-shaped second heat sink 14 can contact with surfaces of the first sub-magnetic core 111 and the second sub-magnetic core 112 by virtue of a second thermally conductive adhesive, so that the second heat sink 14 can be in thermal contact with the magnetic core 11. Specifically, in the Embodiment 3, as shown in FIG. 6, the magnetic core 11 includes two U-shaped magnetic core structures, which are separated vertically to form two vertically overlapped first sub-magnetic core 111 and second sub-magnetic core 112. A layer of second thermally conductive adhesive can be coated on the two opposed surfaces of the first sub-magnetic core 111 and the second sub-magnetic core 112, and the T-shaped second heat sink 14 can be pasted between the first sub-magnetic core 111 and the second sub-magnetic core 112. It should be understood that the thermal contact between the second heat sink 14 and the magnetic core 11 may also be implemented in other ways.

Optionally, the material of the second heat sink 14 can be a metal material with a high thermal conductivity. Preferably, the material of the second heat sink 14 is copper or aluminum.

Optionally, the material of the second heat sink 14 can also be a non-metal material with a high thermal conductivity. Preferably, the material of the second heat sink 14 is a ceramic with a thermal conductivity greater than or equal to 20 W/m·K. In addition, besides the T-shape, it should be understood that the second heat sink 14 may also be in other shapes, such as an L-shape, etc., as long as it can be inserted into the inner part of the magnetic core 11.

The magnetic component provided by the Embodiment 3 includes two T-shaped second heat sinks 14, and the magnetic core 11 includes the first sub-magnetic core 111 and the second sub-magnetic core 112 overlapped in the vertical direction, where the second heat sinks 14 are inserted between the first sub-magnetic core 111 and the second sub-magnetic core 112 along the transverse direction. That is to say, the T-shaped second heat sinks 14 are inserted into the inner part of the magnetic core 11 along the transverse direction, and are arranged between the first sub-magnetic core 111 and the second sub-magnetic core 112. The heat generated inside the magnetic core 11 can be conveniently transferred, through the second heat sink 14 along the transverse direction, from the inner part of the magnetic core 11 surrounded by the winding structure to the outer surface of the magnetic core 11, further improving the heat dissipation effect of the magnetic core 11. In combination with Embodiment 1, the heat dissipation of the magnetic component 10 can be simultaneously realized in the transverse direction, the vertical direction and the longitudinal direction.

Optionally, the disclosure also provides another magnetic component, as shown in FIG. 6, which includes a magnetic core 11 extending in the transverse direction and a winding structure 12 wound on the magnetic core, and the magnetic core 11 includes a first sub-magnetic core 111 and a second sub-magnetic core 112 arranged in a stacked manner along the vertical direction. The magnetic component further includes T-shaped or L-shaped second heat sinks 14, where the second heat sinks 14 are inserted between the first sub-magnetic magnetic core 111 and the second sub-magnetic magnetic core 112 along the transverse direction. The second cooling structures 14 can effectively help the magnetic core 11 to dissipate heat.

Embodiment 4

Figure 7:
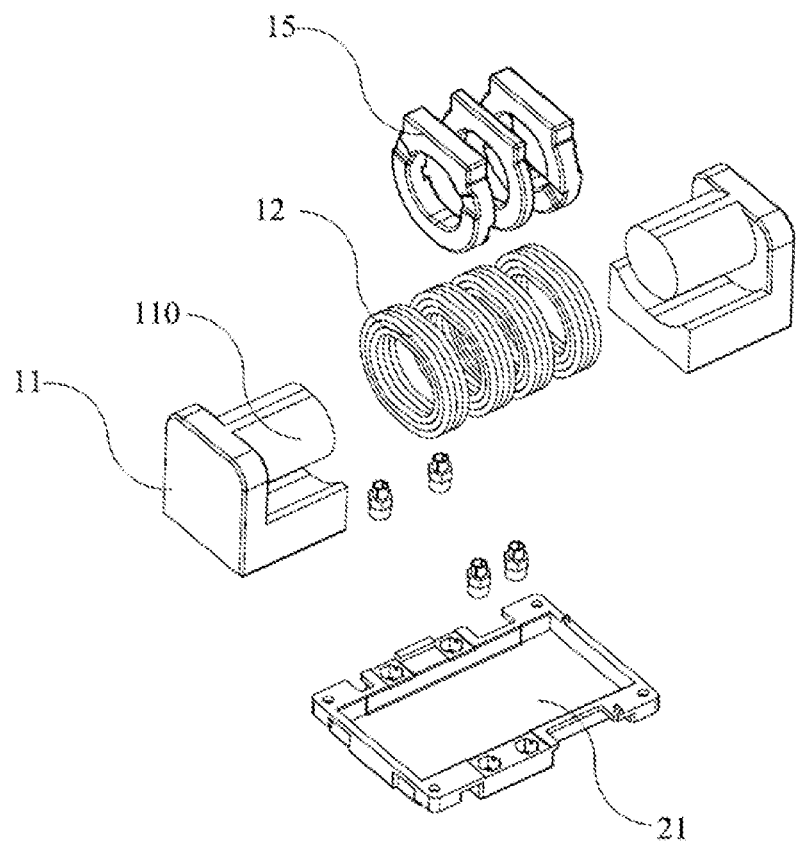
FIG. 7 is an explosive diagram of a magnetic component provided by Embodiment 4 of the present disclosure.
Figure 8:
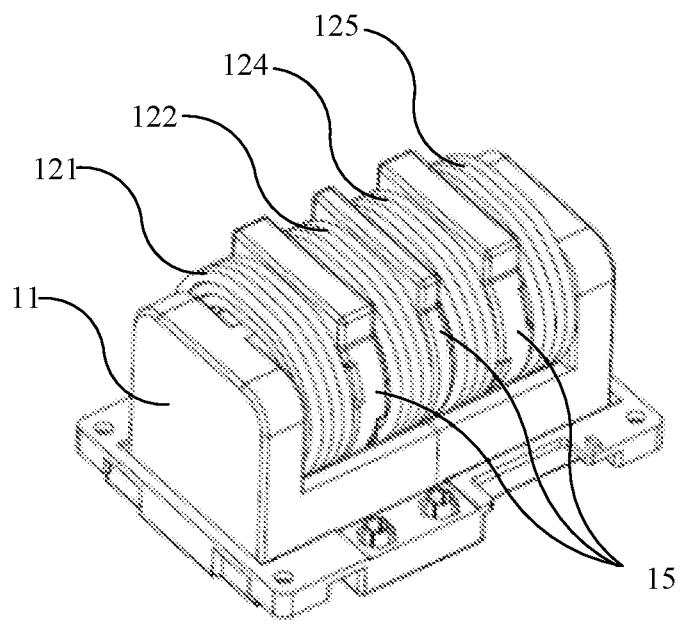
FIG. 8 is an overall assembling diagram of the magnetic component according to Embodiment 4 of the present disclosure.

FIG. 7 is an explosive diagram of a magnetic component provided by Embodiment 4 of the present disclosure, FIG. 8 is an overall assembling diagram of the magnetic component according to Embodiment 4 of the present disclosure. In the embodiment, the magnetic component includes a magnetic core 11, a winding structure and a heat dissipating ring, the winding structure and the heat dissipating ring are sleeved on the magnetic core 11 respectively.

Specifically, referring to FIG. 7, the magnetic core 11 includes a winding column 110 extending in the transverse direction. In the embodiment, the magnetic core 11 includes left and right two parts that are coupled to each other. The magnetic core 11 includes a back and a winding column 110 which is connected to the back and extends in the transverse direction. In the embodiment, the winding column 110 may be cylindrical, but is not limited thereto.

The winding structure 12 sleeved on the winding column 110 includes a plurality of coils, and each coil may include a bobbin and a coil wound on the bobbin, or may simply include the coil without the bobbin. Each coil can be made of an enameled wire, an triple-insulated wire, a self-adhesive wire, a film-coated wire or multiple strands of Litz wires. It should be noted that in the Embodiment 4, at least one coil is used as a primary winding of the transformer, and at least one coil is used as a secondary winding of the transformer.

In the Embodiment 4, a plurality of coils are sequentially spaced at interval along an axial direction of the winding column 110, at least one heat dissipating ring 15 is provided between each adjacent two coils, a heat dissipating ring 15 or a plurality of heat dissipating rings 15 may be provided between two adjacent coils. Exemplarily, as shown in FIG. 8, two sides of the heat dissipating ring 15 are respectively in thermal contact with their respective adjacent coils, and an inner ring surface of the heat dissipating ring 15 is in thermal contact with the winding column 110. Be in thermal contact can be in direct contact, that is, be attached to each other, or in indirect contact through a thermally conductive adhesive or other materials with high thermal conductivities. The arrangement of the heat dissipating ring 15 in the embodiment allows the heat emitted by the magnetic core 11 to be quickly discharged, thereby improving the heat dissipation performance.

In a specific embodiment, as shown in FIG. 8, there are four coils, namely a first coil 121, a second coil 122, a third coil 124, and a fourth coil 125, and there are three heat dissipating rings 15, namely a first heat dissipating ring, a second heat dissipating ring and a third heat dissipating ring, where the first coil 121, the first heat dissipating ring, the second coil 122, the second heat dissipating ring, the third coil 124, the third heat dissipating ring and the fourth coil 125 are sequentially arranged on the winding column 110.

On the basis of the above embodiment, exemplarily, the second coil 122 and the third coil 124 serve as the secondary winding of the transformer, and the first coil 121 and the fourth coil 125 serve as the primary winding of the transformer, or, the second coil 122 and the third coil 124 serve as the primary winding of the transformer, and the first coil 121 and the fourth coil 125 serve as the secondary winding of the transformer. On this basis, the second coil 122 and the third coil 124 are connected in series or in parallel, and the first coil 121 and the fourth coil 125 are connected in series or in parallel.

Figure 9A:
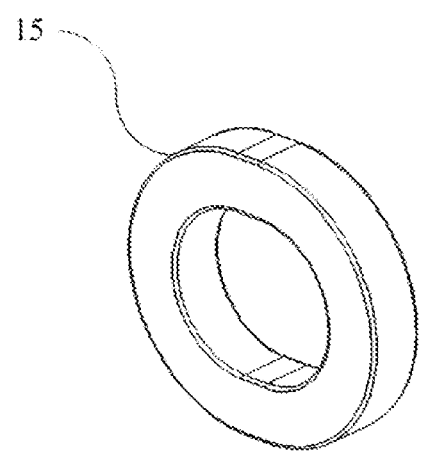
FIG. 9A is a schematic structural diagram 1 of a heat dissipating ring according to FIG. 7.

Further, in the embodiment, a material of the heat dissipating ring 15 is ceramic, and the thermal conductivity of the ceramic is 10 W/m·K. In the embodiment, the setting of shape of the heat dissipating ring 15 have many ways:

In a possible implementation manner, as shown in FIG. 9A, the heat dissipating ring 15 is arranged in a closed ring heat sink. When the closed ring heat sink in the embodiment is sleeved on the winding column 110, an inner ring surface of the closed ring heat sink is in thermal contact with an outer circumferential surface of the winding column 110, that is, they can be directly contact or indirectly connected by a material such as a thermally conductive adhesive. It should be noted that there may be a certain gap between the inner ring surface of the closed ring heat sink and the winding column 110, for example, the gap is less than or equal to 2 mm. Understandably, the above gap can also be filled with a thermally conductive adhesive.

Further, when the heat dissipating ring 15 is arranged in the closed ring heat sink, taking a vertical plane perpendicular to the transverse direction as a cross section, a cross section of the heat dissipating ring is in a shape of a circular ring, an elliptical ring, or a racetrack shape. In addition, it can also be set in other shapes that match with the winding column 110, which is not limited herein.

Figure 9B:
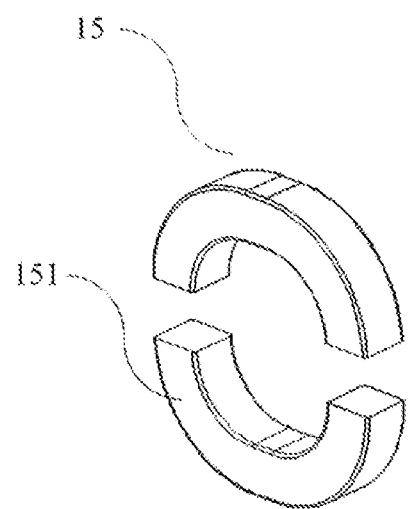
FIG. 9B is a schematic structural diagram 2 of a heat dissipating ring according to FIG. 7.
Figure 9C:
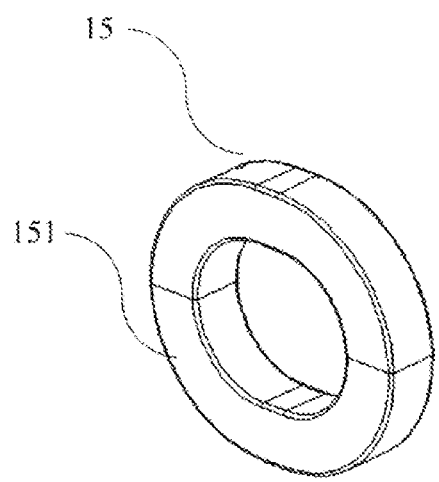
FIG. 9C is a schematic structural diagram 3 of a heat dissipating ring according to FIG. 7.

In another possible implementation manner, as shown in FIG. 9B, the heat dissipating ring 15 includes two arc-shaped heat sinks 151 that are coupled to each other, and the inner ring surfaces of the two arc-shaped heat sinks 151 are oppositely disposed, and the two inner ring surfaces are in thermal contact with the outer circumferential surfaces of the winding column 110 respectively. It should be noted that the two arc-shaped heat sinks 151 may be in the same or different structures. Specifically, the two arc-shaped heat sinks 151 may be respectively set as inferior arcs, and there are gaps between the two ends of the two arc-shaped heat sinks; as shown in FIG. 9C, the two arc-shaped heat sinks can also be set as semi-circular arcs, and the two ends of the two arc-shaped heat sinks are coupled and connected, and the connection may be realized through bonding or clamping, etc.

Figure 9D:
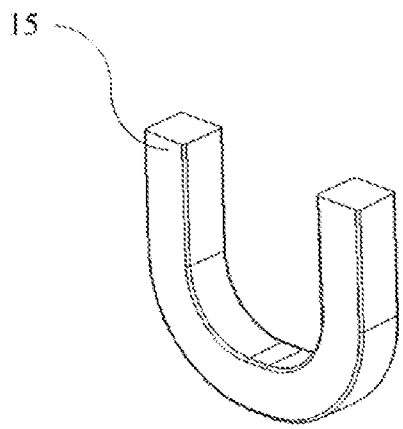
FIG. 9D is a schematic structural diagram 4 of a heat dissipating ring according to FIG. 7.

In another possible implementation manner, the heat dissipating ring 15 is arranged in an aperture ring-shaped heat sink. In the embodiment, as shown in FIG. 9D, the shape of the aperture ring-shaped heat sink can be set in a U shape, in addition, it can also be set as a circular ring with a gap; the aperture ring-shaped heat sink is sleeved on the winding column 110, and the inner ring surface of the aperture ring-shaped heat sink is in thermal contact with the outer circumferential surface of the winding column 110, that is, they may be directly contact, or may be indirectly connected through a material such as a thermally conductive adhesive.

Figure 9E:
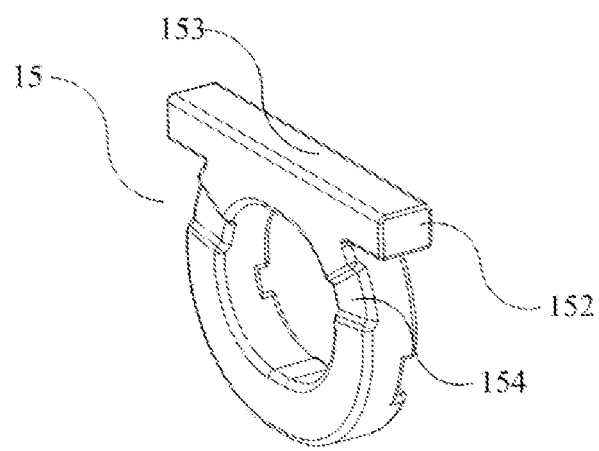
FIG. 9E is a schematic structural diagram 5 of a heat dissipating ring according to FIG. 7.

Further, the outer ring surface of the heat dissipating ring 15 may also be provided with an extending portion 152. The extending portion 152 has a heat dissipating surface 153 for further improving the heat dissipation effect. As shown in FIG. 9E, an extending portion 152 is arranged on the outer surface of the heat dissipating ring 15 in a protrusive manner, and the extending portion 152 has a heat dissipating surface 153 thereon. The heat dissipating surface 153 is used to realize an contact with an inner wall of the metal tank after a subsequent magnetic component is placed in the metal tank, thereby improving the heat dissipation effect. It should be noted that the heat dissipating surfaces 153 of the plurality of heat dissipating rings 15 are located in the same plane to ensure the flatness after being placed in the metal tank.

Further, on the basis of the above embodiment, as shown in FIG. 9E, the heat dissipating ring 15 is provided with a groove 154, and the number of grooves 154 may be one or multiple. It should be noted that the groove 154 can be used as a wire outlet groove for letting wires out, or can be used for pouring a thermally conductive adhesive to further improve the heat dissipation effect.

Embodiment 5

Figure 10:
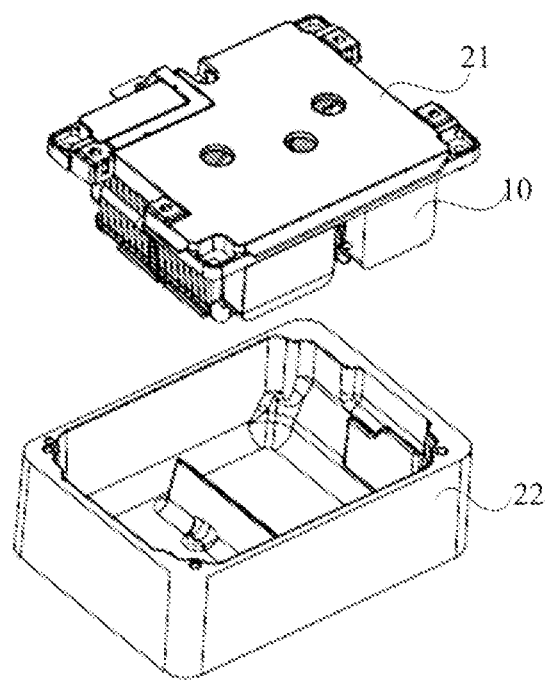
FIG. 10 is an explosive diagram of a power module according to Embodiment 5 of the present disclosure.
Figure 11:
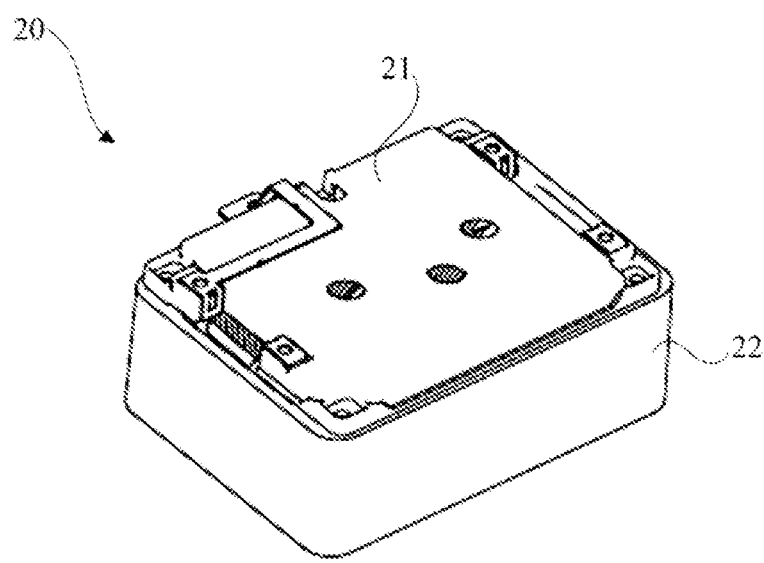
FIG. 11 is an overall schematic structural diagram of a power supply module according to Embodiment 5 of the present disclosure.

FIG. 10 is an explosive diagram of a power module according to Embodiment 5 of the present disclosure, FIG. 11 is an overall schematic structural diagram of a power module according to Embodiment 5 of the present disclosure. As shown in FIG. 10 and FIG. 11, the embodiment 5 provides a power module 20, including a plastic cover 21, a metal tank 22 and the magnetic component 10 according to any one of the above Embodiments 1 to 3. The metal tank 22 and the plastic cover 21 are enclosed into a receiving cavity, and the magnetic component 10 is arranged in the receiving cavity.

Optionally, the power module 20 can be an on-board vehicle charger.

Optionally, the receiving cavity is filled with a third thermally conductive adhesive which covers at least part of the magnetic component 10. The heat generated by the magnetic component 10 can be transferred to the metal tank through the third thermally conductive adhesive, so as to realize the heat dissipation.

Figure 12A:
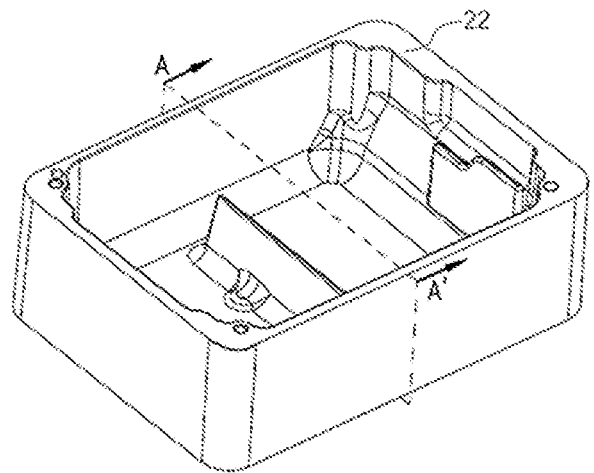
FIG. 12A is a schematic structural diagram of a metal tank according to Embodiment 5 of the present disclosure.
Figure 12B:
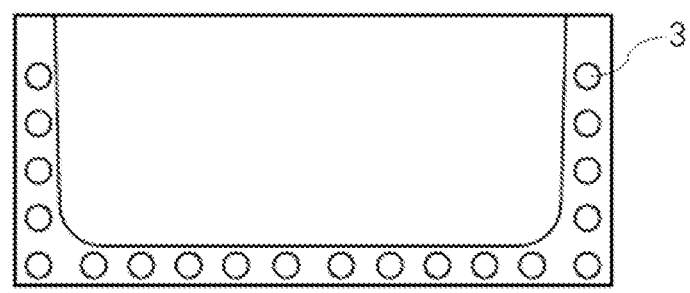
FIG. 12B is an A-A sectional diagram of a metal tank according to Embodiment 5 of the present disclosure.

There are many ways in which the heat generated by the magnetic component 10 is transferred to the metal tank through the third thermally conductive adhesive, and then dissipated to the outside. FIG. 12A is a schematic structural diagram of a metal tank according to the embodiment, and FIG. 12B is an A-A sectional diagram of a metal tank according to the embodiment. Specifically, in one implementation, an outer side of the metal tank or an inner part of the metal tank is provided with a heat dissipating conduit 3, specifically, the heat dissipating conduit 3 can be arranged on an outer wall of the metal tank, or, the metal tank itself has a certain thickness, a cavity is formed inside a cavity wall of the metal tank, and a heat dissipating conduit 3 is provided in the wall. As shown in FIG. 12A-FIG. 12B, the heat dissipating conduit 3 can be circular, square, trapezoid or in other shapes, and can be arranged at any position of the cavity wall. A refrigerant is provided in the heat dissipating conduit, and heat generated by the magnetic component 10 is transferred to the refrigerant in the heat dissipating conduit 3 through the third thermally conductive adhesive and the metal tank, thereby achieving heat exchanging with the refrigerant. It should be understood that the refrigerant in the heat dissipating conduit can be liquid, such as water, etc.

Figure 13:
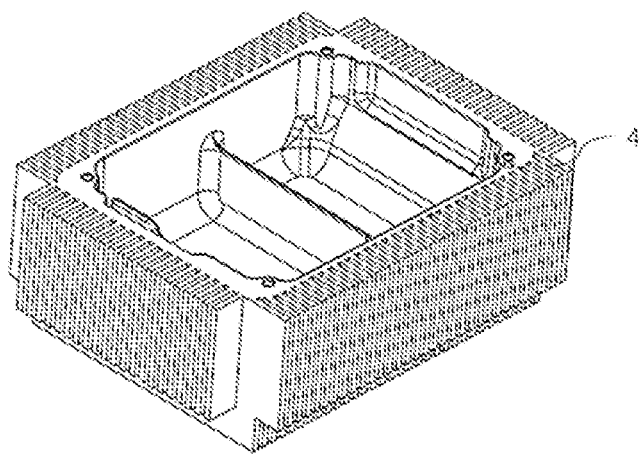
FIG. 13 is a schematic structural diagram of another metal tank according to Embodiment 4 of the present disclosure.

In another implementation, an outer side of the metal tank can be provided with a heat dissipating metal tooth 4. FIG. 13 is another structural diagram of the metal tank according to the embodiment. As shown in FIG. 13, the heat generated by the magnetic component 10 is transferred to the heat dissipating metal tooth 4 through the third thermally conductive adhesive and the metal tank, and the heat is dissipated through the heat dissipating metal tooth 4, so as to realize the heat dissipation of the magnetic component 10.

In one embodiment, the embodiment of the present disclosure also provides a power module, the power module includes a magnetic component 10, as shown in FIG. 6, the magnetic component 10 includes a magnetic core 11 extending in a transverse direction and a winding structure 12 wound on the magnetic core, and the magnetic core 11 includes a first sub-magnetic core 111 and a second sub-magnetic core 112 arranged in a stacked manner along a vertical direction. It further includes T-shaped second heat sinks 14, where the second heat sinks 14 are inserted between the first sub-magnetic core 111 and the second sub-magnetic core 112 along the transverse direction. In other embodiments, the second heat sinks 14 may also be L-shaped.

The embodiment provides a power module 20, including a magnetic component 10, the magnetic component 10 includes a first heat sink 13, a magnetic core 11 extending in a transverse direction and a winding structure 12 wound on the magnetic core 11, the winding structure 12 at least includes a first coil 121 and a second coil 122 arranged adjacently along a transverse direction, a gap 123 is provided between the first coil 121 and the second coil 122, at least part of the first heat sink 13 is arranged in the gap 123, the first heat sink 13 is in thermal contact with the first coil 121, the second coil 122 and the magnetic core 11, the first heat sink 13 can be beneficial for the heat dissipation of the magnetic core 11, the first coil 121 and the second coil 122 along the vertical and longitudinal directions, thus improving the heat dissipation effect of the magnetic component 10.

Embodiment 6

Figure 14:
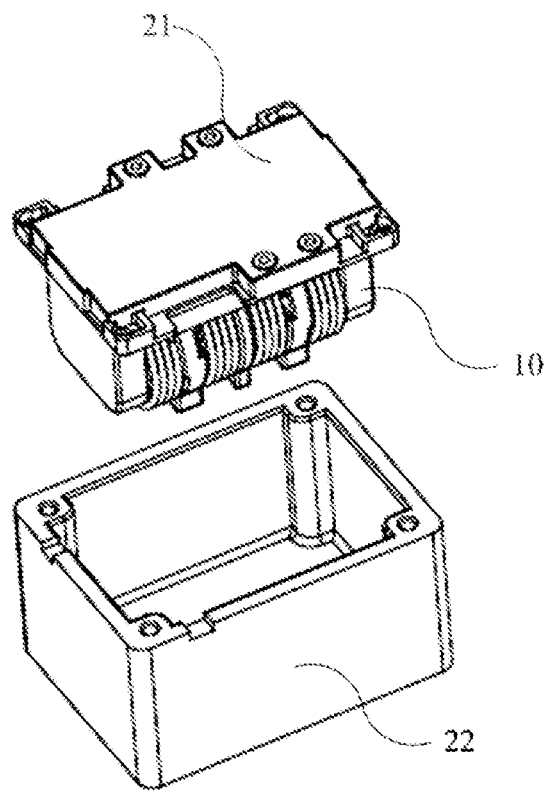
FIG. 14 is an explosive diagram of a power module according to Embodiment 6 of the present disclosure.
Figure 15:
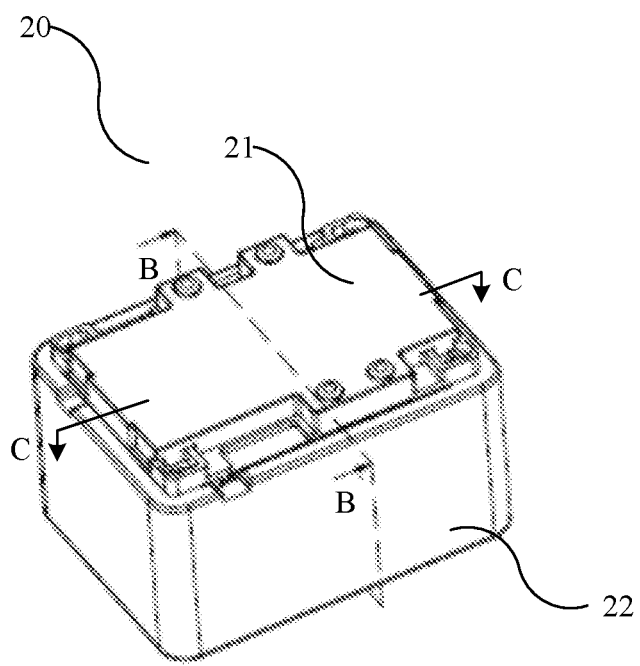
FIG. 15 is an overall schematic structural diagram of a power supply module according to Embodiment 6 of the present disclosure.
Figure 16:
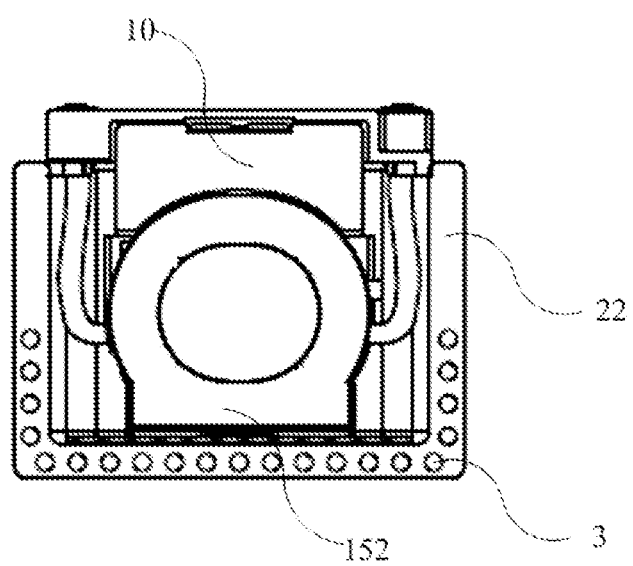
FIG. 16 is a B-B sectional diagram of a metal tank according to FIG. 15.
Figure 17:
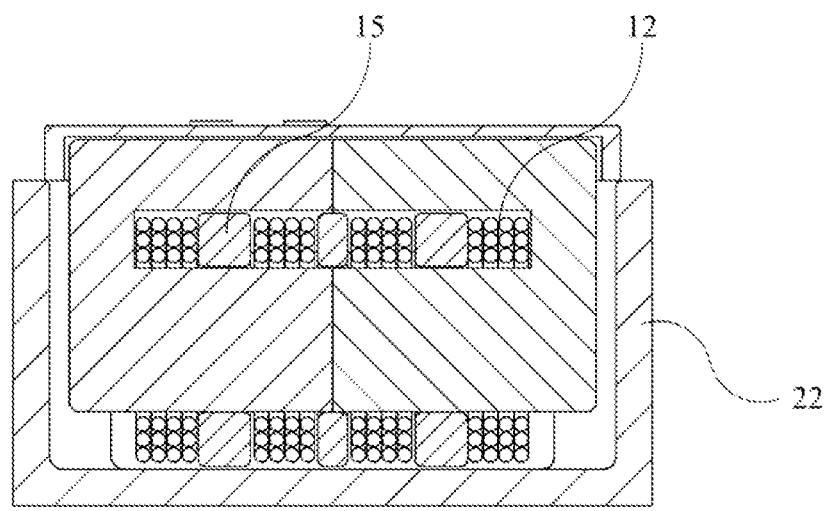
FIG. 17 is a C-C sectional diagram of a metal tank according to FIG. 15.

FIG. 14 is an explosive diagram of a power module according to Embodiment 6, FIG. 15 is an overall schematic structural diagram of a power module according to Embodiment 6; FIG. 16 is a B-B sectional diagram of a metal tank according to FIG. 15; FIG. 17 is a C-C sectional diagram of a metal tank according to FIG. 15. As shown in FIG. 14, FIG. 15 and FIG. 17, the embodiment 6 provides a power module 20, including: a plastic cover 21, a metal tank 22 and the magnetic component 10 in the above Embodiment 4, the metal tank 22 and the plastic cover 21 form an accommodating cavity, and the magnetic component 10 is disposed in the accommodating cavity. The plastic cover 21 and the metal tank 22 in the power module provided in the embodiment are the same as those in the above Embodiment 5, which are not repeated herein again.

It should be noted that, in the magnetic component 10 provided in the above Embodiment 4, when the heat dissipating ring 15 is provided with the extending portion 152, the heat dissipating surface 153 on the extending portion 152 is located on the side of the extending portion 152 apart from the plastic cover 21. As shown in FIG. 14 and FIG. 16, the extending portion 152 is attached to an inner bottom surface of the metal tank 22, so that the heat dissipating surface 153 is attached to the metal tank 22, and the heat dissipated by the magnetic core or the coil can be directly introduced into the metal tank 22 through the heat dissipating surface 153, and transferred to the refrigerant in the heat dissipating conduit 3 through the metal tank 22, so as to achieve heat exchanging with the refrigerant, thereby realizing the heat dissipation of the magnetic component 10, and improving the heat dissipation effect.

The embodiments or implementation manners in the specification are described in a progressive manner. Each embodiment focuses on the differences from other embodiments, and reference may be made to each other for the same or similar parts among the various embodiments.

In the description of the specification, description made with reference to terms "one embodiment", "some embodiments", "a schematic embodiment", "an example", "a specific example", or "some examples" is intended to make specific features, structures, materials, or characteristics described in the implementation manners or examples be included in at least one embodiment or example of the present disclosure. In the specification, schematic expressions of the above-mentioned terms do not necessarily refer to the same embodiment or example. Moreover, the specific features, structures, materials, or characteristics described may be combined with each other in a suitable manner in any one or more embodiments or examples.

Finally, it should be noted that the above embodiments are merely intended for describing, rather than limiting, the technical solutions of the present disclosure; although the present disclosure has been described in detail with reference to the foregoing embodiments, those skilled in the art will understand that they may still make modifications to the technical solutions described in the foregoing embodiments, or make equivalent substitutions to some or all of the technical features therein; and the modifications or substitutions do not make the essence of the corresponding technical solutions deviate from the scope of the technical solutions in the embodiments of the present disclosure.

What is claimed is:

1. A magnetic component, comprising a first heat sink, a magnetic core extending in a transverse direction and a winding structure wound on the magnetic core;
    wherein the winding structure at least comprises a first coil and a second coil arranged adjacently along the transverse direction, a gap is provided between the first coil and the second coil, at least part of the first heat sink is arranged in the gap, the first heat sink is in thermal contact with the first coil, the second coil and the magnetic core;
    wherein the first heat sink is in direct contact with the first coil, the second coil and the magnetic core, or the first heat sink is in indirect contact with the first coil, the second coil and the magnetic core through a first thermally conductive adhesive;
    wherein the first heat sink comprises a heat conducting portion extending in a vertical direction from a top of the magnetic core towards a bottom of the magnetic core, and the heat conducting portion covers at least part of the magnetic core; and
    the magnetic component further comprising two second heat sinks that are U-shaped or L-shaped, one of the second heat sinks is inserted between the magnetic core and the first coil along the transverse direction, and the other second heat sink is inserted between the magnetic core and the second coil along the transverse direction.

2. The magnetic component according to claim 1, wherein the first heat sink further comprises an extending portion that is connected with the heat conducting portion, the extending portion extends along the transverse direction, and the extending portion is in thermal contact with at least part of an outer surface of at least one of the first coil and the second coil.

3. The magnetic component according to claim 1, wherein the first heat sink comprises a metal material with a thermal conductivity greater than or equal to 100 W/m·K; or the first heat sink comprises a non-metal material with a thermal conductivity greater than or equal to 20 W/m·K.

4. The magnetic component according to claim 1, wherein the magnetic core comprises two U-shaped magnetic core structures, and the two U-shaped magnetic core structures are configured to form a closed magnetic path.

5. The magnetic component according to claim 1, wherein the second heat sink is in thermal contact with a surface of the magnetic core through a second thermally conductive adhesive;

wherein the second heat sink comprises a metal material with a thermal conductivity greater than or equal to 100 W/m·K; or the second heat sink comprises a non-metal material with a thermal conductivity greater than or equal to 20 W/m·K.

6. The magnetic component according to claim 1, wherein the magnetic component further comprises a bobbin sleeved on an outer circumference of the magnetic core, and the winding structure is wound on the bobbin;

wherein the bobbin is an integrated structure, and the first coil and the second coil are wound on the bobbin, and the bobbin has a hollow structure at a position corresponding to the gap; or, the bobbin comprises a first bobbin structure and a second bobbin structure that are separated from each other, the first winding is wound on the first bobbin structure, the second winding is wound on the second bobbin structure, the first bobbin structure and the second bobbin structure are separated by a distance, and opposed surfaces of the first bobbin structure and the second bobbin structure have hollow structures;

wherein the hollow structure is the opening of the bobbin in which the first heat sink is inserted, the hollow structure is connected with the gap.

\* \* \* \* \*